United States Patent
Köhler et al.

(10) Patent No.: US 10,454,406 B2
(45) Date of Patent: Oct. 22, 2019

(54) DYNAMO-ELECTRIC MACHINE COMPRISING A SIGNALING SYSTEM FOR RECOGNIZING SHORT CIRCUITS IN THE WINDING SYSTEM

(71) Applicant: SIEMENS AKTIENGESELLSCHAFT, München (DE)

(72) Inventors: Marco Köhler, Neunkirchen am Sand (DE); Christoph Adam, Nürnberg (DE); Hans Friedrich Steffani, Nürnberg (DE); Bernhard Volk, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 306 days.

(21) Appl. No.: 15/534,320

(22) PCT Filed: Nov. 20, 2015

(86) PCT No.: PCT/EP2015/077222
§ 371 (c)(1),
(2) Date: Jun. 8, 2017

(87) PCT Pub. No.: WO2016/091556
PCT Pub. Date: Jun. 16, 2016

(65) Prior Publication Data
US 2018/0262154 A1    Sep. 13, 2018

(30) Foreign Application Priority Data
Dec. 9, 2014    (EP) ..................... 14196967

(51) Int. Cl.
*B60L 3/00* (2019.01)
*H02P 29/68* (2016.01)
(Continued)

(52) U.S. Cl.
CPC ............ *H02P 29/68* (2016.02); *B60L 3/0061* (2013.01); *H02K 11/25* (2016.01); *B60L 2240/425* (2013.01); *H02K 3/505* (2013.01)

(58) Field of Classification Search
CPC ........ H02K 11/25; B60L 3/0061; H02P 29/68
See application file for complete search history.

(56) References Cited

U.S. PATENT DOCUMENTS 3,723,932 A    3/1973    Miller et al.
5,367,282 A    11/1994   Clem
(Continued)

FOREIGN PATENT DOCUMENTS

DE    10 2005 004 835 A1    8/2006
EP           1 418 659 A1    5/2004
(Continued)

*Primary Examiner* — Jared Fureman
*Assistant Examiner* — Esayas G Yeshaw
(74) *Attorney, Agent, or Firm* — Henry M. Feiereisen LLC

(57) ABSTRACT

A dynamo-electric machine includes a laminated stator, a laminated rotor and a winding system disposed in the laminated stator and/or the laminated rotor and forming a winding overhang on end faces of the laminated stator and/or laminated rotor. The winding system includes a signaling line to detect interturn faults generated by a high heat. An insulation of signaling lines or a wire of the signaling lines is configured to be temperature-sensitive so that a melting point of the insulation or of the wire is about 30 degrees Kelvin above the temperature class of the dynamo-electric machine.

18 Claims, 2 Drawing Sheets

(51) Int. Cl.
*H02K 11/25* (2016.01)
*H02K 3/50* (2006.01)

(56) References Cited

U.S. PATENT DOCUMENTS

| | | | |
|---|---|---|---|
| 6,031,335 | A | 2/2000 | Lawrence |
| 9,592,737 | B2 | 3/2017 | Steffani |
| 9,925,633 | B2* | 3/2018 | Weiss ................... F28D 15/00 |
| 2009/0232183 | A1 | 9/2009 | Salem et al. |
| 2010/0202491 | A1 | 8/2010 | Harrington |
| 2013/0111998 | A1* | 5/2013 | Hull .................... G01N 29/043 |
| | | | 73/643 |
| 2014/0009013 | A1* | 1/2014 | Chamberlin ............. H02K 9/19 |
| | | | 310/54 |
| 2014/0053646 | A1* | 2/2014 | Takasaki .............. G01D 11/245 |
| | | | 73/431 |
| 2014/0062184 | A1 | 3/2014 | Rao et al. |
| 2016/0099617 | A1 | 4/2016 | Koehler et al. |

FOREIGN PATENT DOCUMENTS

| | | |
|---|---|---|
| RU | 2162244 C2 | 1/2001 |
| RU | 2519047 C2 | 6/2014 |
| SU | 855875 A1 | 8/1981 |

\* cited by examiner

DYNAMO-ELECTRIC MACHINE COMPRISING A SIGNALING SYSTEM FOR RECOGNIZING SHORT CIRCUITS IN THE WINDING SYSTEM

CROSS-REFERENCES TO RELATED APPLICATIONS

This application is the U.S. National Stage of International Application No. PCT/EP2015/077222, filed Nov. 20, 2015, which designated the United States and has been published as International Publication No. WO 2016/091556 A1 and which claims the priority of European Patent Application, Serial No. 14196967.5, filed Dec. 9, 2014, pursuant to 35 U.S.C. 119(a)-(d).

BACKGROUND OF THE INVENTION

The invention relates to a dynamo-electric machine comprising a laminated stator and a laminated rotor and one or more winding systems.

As a result of the winding systems generally arranged in grooves of a laminated element, dynamo-electric machines have winding overhangs on the end faces of the laminated stator and/or laminated rotor. These winding overhangs are produced by the diversion of the electrical conductors of the winding system on the end faces of the laminated stator and/or laminated rotor. Above all in the area of the winding overhangs the electrical conductors are in contact with electrical conductors of adjacent electrical phases via the insulation. This insulation can be damaged by insulation faults, caused for example by overtemperatures or overvoltages and an interturn fault occurs in the winding overhang and/or groove area.

The development of heat and/or noise resulting from the interturn fault, as well as any further torque of the motor that will occur can represent a possible danger for the operating personnel or for the dynamo-electric machine. Therefore an interturn fault must be recognized in good time, in order to enable suitable measures to be initiated where necessary.

With electrically driven vehicles with a number of electric motors for example the vehicle will continue to be operated, even when there is a defect in a drive or in a motor. In such cases the defective motor will as a rule be disconnected from the energy supply. If there is an interturn fault in the defective motor the speed of the vehicle or the rotational speed of the defective motor that thus exists will mean that electrical energy continues to be fed into the location of the fault. Disconnection from the electrical supply makes it more difficult to recognize or to trace an interturn fault however. Depending on the severity of the possible consequences of the fault, a detected interturn fault can have significant effects on the operational management of such vehicles.

Under some circumstances in such cases this involves a reduction in the speed or even this vehicle coming to a standstill. Recognition of interturn faults must therefore be very reliable. Above all it may not result in any false triggers. Also only serious interturn faults with critical effects should be recognized, in order not to disrupt the operation of the vehicle.

The following methods for detection of interturn faults are currently known. The use of temperature sensors involves the disadvantage of the interturn fault having to be in the direct vicinity of the sensor. If the motor is comparatively well cooled, an interturn fault may possibly not be detected via temperature sensors.

Likewise a diagnosis via the converter currents is possible, in which case the short circuit to ground or non-symmetry of the motor currents is detected by the control software of the converter and it is concluded that there is an interturn fault.

The disadvantage here is that, with this protection concept, the converter disconnects itself from the motor in the event of a motor fault. When the converter is disconnected from the motor however an interturn fault of the motor can no longer be recognized by the control software.

SUMMARY OF THE INVENTION

Using this as its starting point, the underlying object of the invention is to provide a dynamo-electric machine having a signaling system that reliably recognizes interturn faults. In this invention the drive system in which the dynamo-electric machine is used is also to be monitored.

The desired object is successfully achieved by a dynamo-electric machine comprising a laminated stator and a laminated rotor, wherein the laminated stator and/or the laminated rotor each have one or more winding systems, which form a winding overhang on the respective end faces of the laminated stator and/or laminated rotor, wherein at least one signaling line is provided in the winding system, in particular in or on the winding overhang, in order to detect interturn faults.

The desired object is likewise successfully achieved by a drive system with at least one converter and at least one dynamo-electric machine, wherein the signaling line is routed in the converter and is integrated into an evaluation system there.

As an alternative thereto the evaluation system can also be arranged separately electrically and/or spatially in relation to the dynamo-electric machine and/or the converter.

The desired object is also successfully achieved by an electrically driven vehicle with at least one drive system.

In accordance with the invention a signaling line, e.g. a cable with at least two wires twisted and insulated from one another will be used. A defined terminating resistor is preferably attached to the ends of the line. This makes it easier to recognize the interturn fault and makes a spatial localization of the interturn fault easier.

In this case the signaling line is preferably provided on the winding overhang of the stator and/or on the winding overhang of the rotor, since the individual phases are arranged above one another or crossed there and thus the insulation is subjected to a corresponding voltage stress. The signaling line can however also run in or on the winding system or in one or more grooves of the respective laminated core, in order to make a holistic monitoring of the dynamo-electric machine for interturn faults possible.

In another version of the invention the signaling line is implemented as a coaxial cable, wherein an inner conductor is located in a hollow cylindrical outer conductor and a terminating resistor is likewise provided optionally between inner and outer conductor. In such cases temperature-sensitive insulation is located between inner conductor and outer conductor of this coaxial cable.

An interturn fault, as in the version of the signaling line with twisted line, is recognized either by electrical contact between inner and outer conductor or also be disconnection of the two conductors.

The measurement method during operation of the dynamo-electric machine or for maintenance purposes and the respective evaluation of the recorded data can also be effected with measurement signals of a higher frequency—i.e. up to the range of a few Kilohertz (KHz).

As an alternative to the existing solutions, non-insulated signaling lines in the winding system are also conceivable, the conductors of which are manufactured from metals with a low melting point such as zinc or lead. This means that one is not restricted to melting of insulation. Such a signaling wire, made of lead for example, would melt at 327° and indicate an interturn fault by disconnection of this wire. These non-insulated signaling lines will be arranged or laid in the winding system, in particular in the winding overhang, so that there is no direct contact between these lines and there is thus no danger of a short circuit between the individual signaling lines.

In all the forms of embodiment given above a melting of the insulation or of the wire advantageously lies at around 30 degrees Kelvin above the respective temperature class of the dynamo-electric machine, in order not to endanger the correct operation of the machine with false triggers.

This means that faults and false triggers about overtemperatures are now excluded and—if this message is issued—only an interturn fault can be involved.

Furthermore versions are conceivable which already integrate the signaling line or signaling lines into the power cable that connects the converter to the dynamo-electric machine. The status of the signaling line is then evaluated by suitable test signals of the converter. The signals can be generated and evaluated both while the vehicle is moving and when it is at a standstill. When it is at a standstill in such cases the dynamo-electric machine can again be briefly connected to the converter.

In a further form of embodiment such measurements are also possible directly at the dynamo-electric machine, in that supplementary measurement jacks are provided there, via which the measurements are also able to be carried during the operation of the dynamo-electric machine.

Advantageously resistors arranged in the signaling line as a function of location means that a local assignment of a fault takes place in the area of the dynamo-electric machine. For example this enables it to be determined whether an interturn fault is present in the groove, in the winding overhang, where in the winding overhang etc.

Likewise faults in the supply line are also recognized in this way for evaluation. The signaling line only responds if a sufficiently large amount of heat develops in the winding overhang and this leads to a melting of the insulation or of the wire. In this way serious interturn faults, which lead to adverse effects on operation, will be recognized. The location dependency of the response of the signaling line enables the heating in the winding system leading to the interturn fault, in particular in the winding overhangs at the complete circumference and/or axial length of the winding system of the dynamo-electric machine to be recognized.

It is thus possible to trace a fault location and in accordance with the invention a simple integration into the existing protection functions of the drive system takes place. No complex algorithms or temperature models of the dynamo-electric machine, especially for the winding system, which unfortunately can only inadequately represent the reality, are needed.

By comparison with fire alarm lines, in accordance with the invention the interturn fault and thus a destruction of the winding overhang by a serious interturn fault will be safely recognized beforehand. Fire alarm lines on the other hand will primarily be used in other components of an electric vehicle to recognize fires. Also the insulation of the fire alarm line is not suitable as a rule for the high voltages in the motor.

BRIEF DESCRIPTION OF THE DRAWING

The invention, as well as advantageous embodiments of the invention, will be explained in greater detail on the basis of the exemplary embodiments given below. In the figures.

DETAILED DESCRIPTION OF PREFERRED EMBODIMENTS

Figure 1:
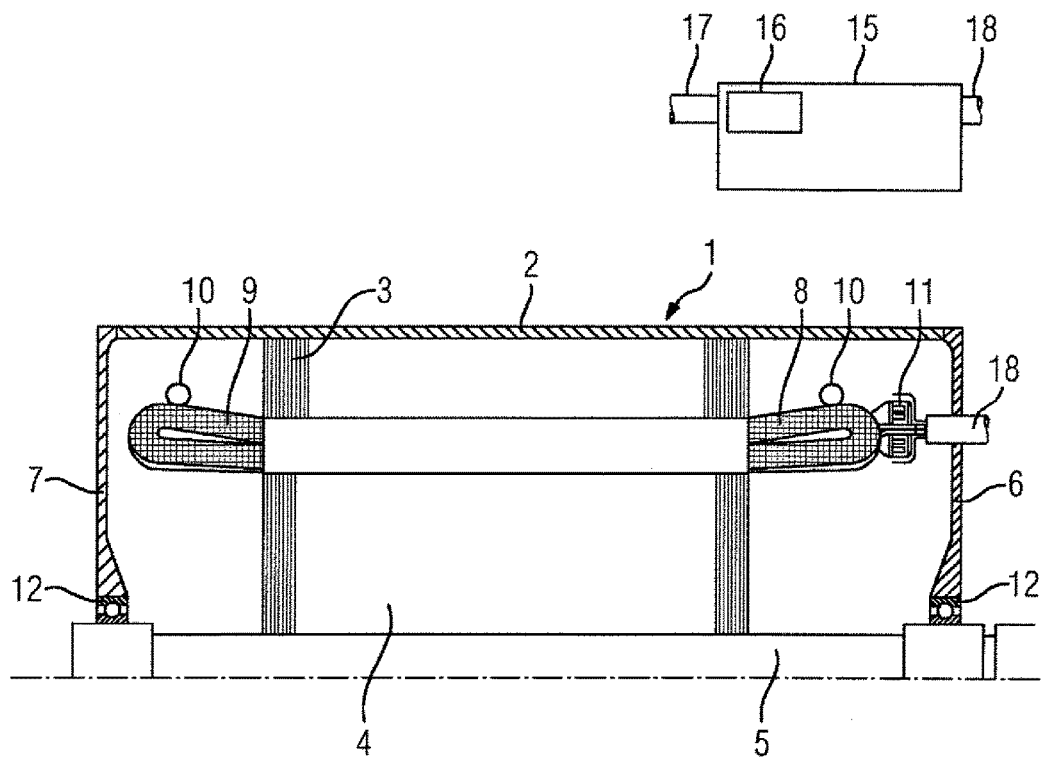
FIG. 1 shows part of a longitudinal cross-section of a dynamo-electric machine.

FIG. 1 shows sections of a longitudinal cross-section of a dynamo-electric machine 1, which is accommodated in a housing 2. On a shaft 5 a laminated rotor 4 is connected non-rotatably to the shaft 5. The rotor embodied with the laminated rotor 4 has as its means of excitation either permanent magnets or its own electrical excitation, which will be fed to the winding system of the rotor via slip rings.

For the sake of providing an improved overview however, only the winding system of the stator will be considered in any greater detail. The winding system of the laminated stator 3 is arranged in grooves not shown in any greater detail and on the end faces of the laminated stator 3 a winding overhang 8 is present on the drive side and a winding overhang 9 is present on the non-drive side. Likewise, for the sake of providing an improved overview, the signaling lines 10 are shown overdimensioned, arranged on the winding overhangs 8, 9, in the figure; they can of course also run inside the winding overhang 8, 9 and/or in one or more grooves of the winding system.

The signaling line 10 is arranged between conductors of a phase and/or between conductor and grounded laminated element and/or between the conductors of different phases.

On the drive side a switching connector is located on the winding overhang 8, which electrically distributes the coil groups of the similar electrical phases in the circumferential direction of the stator and connects them electrically to one another. The dynamo-electric machine 1 will be fed via a power cable 18, which is connected to the converter 15.

The shaft 5 is supported via bearings 12 and the respective bearing shields 6 and 7 on the housing. The converter 15 obtains via an electrical supply network 17 or via a catenary wire an electrical voltage, which will be adapted electrically by means of converter 15 of the dynamo-electric machine 1 and will be provided to the dynamo-electric machine 1 via the power cable 18.

The signaling lines 10 are either laid separately between converter 15 and dynamo-electric machine 1 or will be provided together with the power cables in a wiring loom of the dynamo-electric machine 1 via a corresponding plug connector. Corresponding messages/data sequences/evaluations relating to faults in the winding system and thus of the operating sequence can be shown on a display 16 in the converter 15 and/or in one or more separate displays at different locations.

As an alternative or in addition thereto, the data can also be transferred to a monitoring device, which automatically initiates further actions, such as e.g. switching off a motor, reducing the power of the drive etc.

The data can be transferred to the displays and/or to the monitoring device both by wire and also wirelessly.

Figure 2:
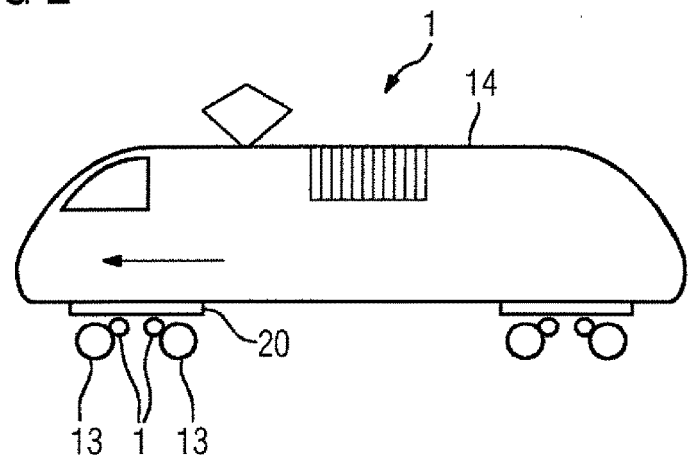
FIG. 2 shows an application of a drive system for locomotives.

The application of such a dynamo-electric machine 1 forms a drive system, which features converter 15 and a dynamo-electric machine 1 and which e.g. is arranged in a locomotive 14 as depicted in FIG. 2. In this case the locomotive 14 has two bogies 20, each with two wheelset shafts. Each wheelset shaft will be driven via a dynamo-electric machine 1 and an associated converter 15.

The status of the signaling line 10 and thus the state of the respective winding system or winding overhang 8, 9 is measured for example by suitable test signals of the respective converter 15. The signals can be generated and evaluated both when the vehicle is moving and when it is at a standstill. The measurement results are evaluated directly in the locomotive 14 and can be transferred to the locomotive driver, to the train driver or to a central monitoring device outside the locomotive or the train.

The application of the inventive thinking is naturally not solely restricted to locomotives 14, but instead extends to all electrically driven vehicles such as mining trucks, streetcars, e-cars, e-aircraft applications etc.

Figure 3:
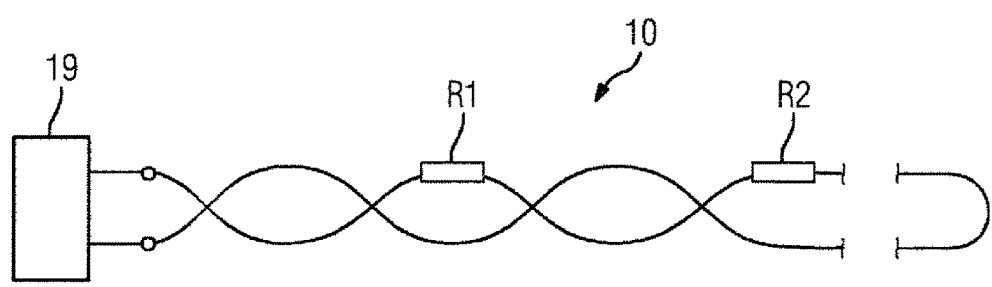
FIG. 3, 4 show a signaling line.

The signaling line 10 is embodied in accordance with FIG. 3 as a twisted, insulated cable, wherein to be able to assign the interturn fault to a specific location, resistors R1, R2 etc. are provided concentrated at predeterminable distances. Thus, by application of signals used—direct current (DC) signals or alternating current signals (AC into the KHz range) an interturn fault can be recognized. In this way an interturn fault can be determined via the evaluation unit 19 at a particular location within the dynamo-electric machine 1.

Figure 4:
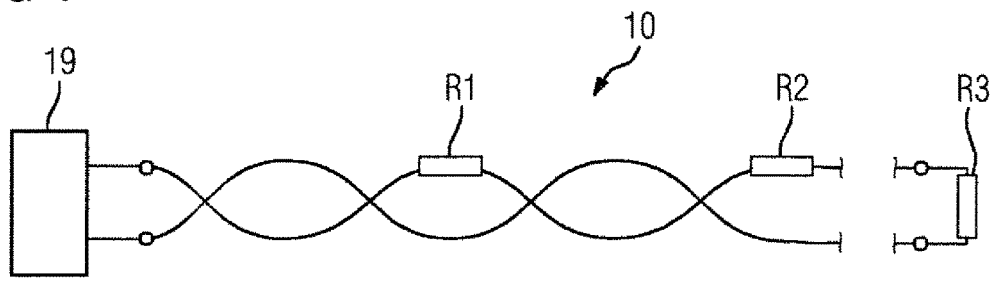

FIG. 4 shows an example of an actual termination of a twisted, insulated signaling line 10 in the form of a predetermined resistor R3.

What is claimed is:

1. A dynamo-electric machine, comprising:
a laminated stator;
a laminated rotor interacting with the laminated stator;
a winding system disposed in at least one member selected from the group consisting of the laminated stator and the laminated rotor, said winding system forming a winding overhang on end faces of the member; and
a signaling line provided in the winding system to detect an interturn fault generated by heat, said signaling line being configured in one of two ways, a first way in which the signaling line is insulated by an insulation which is configured temperature-sensitive and defined by a melting point which is about 30 degrees Kelvin above a temperature class of the dynamo-electric machine, a second way in which the signaling line includes a wire which is configured temperature-sensitive and defined by a melting point which is about 30 degrees Kelvin above a temperature class of the dynamo-electric machine.

2. The dynamo-electric machine of claim 1, wherein the signaling line is disposed in or on the winding overhang.

3. The dynamo-electric machine of claim 1, wherein the signaling line is formed by two of said wire, said wires being twisted and insulated from one another.

4. The dynamo-electric machine of claim 1, wherein the signaling line is configured as a coaxial cable.

5. The dynamo-electric machine of claim 4, wherein the coaxial cable has an inner conductor and an outer conductor, said temperature-sensitive insulation is disposed between the inner and outer conductors of the coaxial cable.

6. The dynamo-electric machine of claim 1, wherein the wire of the signaling line is a non-insulated wire made of metal.

7. The dynamo-electric machine of claim 6, wherein the non-insulated metal wire is composed of lead or zinc.

8. A drive system, comprising:
a dynamo-electric machine including a laminated stator, a laminated rotor interacting with the laminated stator, a winding system disposed in at least one member selected from the group consisting of the laminated stator and the laminated rotor, said winding system forming a winding overhang on end faces of the member, and a signaling line provided in the winding system to detect an interturn fault generated by heat, said signaling line being configured in one of two ways, a first way in which the signaling line is insulated by an insulation which is configured temperature-sensitive and defined by a melting point which is about 30 degrees Kelvin above a temperature class of the dynamo-electric machine, a second way in which the signaling line includes a wire which is configured temperature-sensitive and defined by a melting point which is about 30 degrees Kelvin above a temperature class of the dynamo-electric machine; and
a converter including an evaluation system, said signaling line being routed into the converter and integrated in the evaluation system.

9. The drive system of claim 8, further comprising a power cable in which the signaling line is integrated and which connects the converter to the dynamo-electric machine.

10. The drive system of claim 8, wherein the signaling line is disposed in or on the winding overhang.

11. The drive system of claim 8, wherein the signaling line is formed by two of said wire, said wires being twisted and insulated from one another.

12. The drive system of claim 8, wherein the signaling line is configured as a coaxial cable.

13. The drive system of claim 12, wherein the coaxial cable has an inner conductor and an outer conductor, said temperature-sensitive insulation is disposed between the inner and outer conductors of the coaxial cable.

14. The drive system of claim 8, wherein the wire of the signaling line is a non-insulated wire made of metal.

15. The drive system of claim 14, wherein the non-insulated metal wire is composed of lead or zinc.

16. An electrically driven vehicle, comprising a drive system, said drive system comprising a dynamo-electric machine including a laminated stator, a laminated rotor interacting with the laminated stator, a winding system disposed in at least one member selected from the group consisting of the laminated stator and the laminated rotor, said winding system forming a winding overhang on end faces of the member, and a signaling line provided in the winding system to detect an interturn fault generated by heat, said signaling line being configured in one of two ways, a first way in which the signaling line is insulated by an insulation which is configured temperature-sensitive and defined by a melting point which is about 30 degrees Kelvin above a temperature class of the dynamo-electric machine, a second way in which the signaling line includes a wire which is configured temperature-sensitive and defined by a melting point which is about 30 degrees Kelvin above a temperature class of the dynamo-electric machine, and a converter including an evaluation system, said signaling line being routed into the converter and integrated in the evaluation system.

17. A method for determining an interturn fault of a dynamo-electric machine, comprising:
- configuring a signaling line in one of two ways, a first way in which the signaling line is insulated by an insulation which is configured temperature-sensitive and defined by a melting point which is about 30 degrees Kelvin above a temperature class of the dynamo-electric machine, a second way in which the signaling line includes a wire which is configured temperature-sensitive and defined by a melting point which is about 30 degrees Kelvin above a temperature class of the dynamo-electric machine;
- disposing the signaling line in a winding system of a member selected from the group consisting of a laminated stator and a laminated rotor of the dynamo-electric machine;
- applying a measurement signal to the signaling line; and
- evaluating a feedback signal directly on the dynamo-electric machine and/or displaying the feedback signal via a display on a converter and/or displaying the feedback signal via one or more separate displays.

18. The method of claim 17, wherein the signaling line is disposed in or on a winding overhang of the winding system.

\* \* \* \* \*